US012585824B2

(12) United States Patent (10) Patent No.: US 12,585,824 B2
Trivedi et al. (45) Date of Patent: Mar. 24, 2026

(54) MANAGING TEAM ACCESS TO WORKBOOKS EMBEDDED IN CLIENT DOMAINS

(71) Applicant: SIGMA COMPUTING, INC., San Francisco, CA (US)

(72) Inventors: Zalak H. Trivedi, San Leandro, CA (US); Samuel Andre Abraham Soubeyran, Mountain View, CA (US); Hiranmaya Gundu, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 135 days.

(21) Appl. No.: 18/498,491

(22) Filed: Oct. 31, 2023

(65) Prior Publication Data

US 2025/0139294 A1 May 1, 2025

(51) Int. Cl.
*G06F 21/00* (2013.01)
*G06F 21/62* (2013.01)
(52) U.S. Cl.
CPC .................................. *G06F 21/629* (2013.01)
(58) Field of Classification Search
CPC ...... G06F 21/629; G06F 21/31; G06F 21/604; G06F 21/6218; H04L 63/104; G06Q 10/103
See application file for complete search history.

(56) References Cited

U.S. PATENT DOCUMENTS

| | | | |
|---|---|---|---|
| 12,259,968 B2 * | 3/2025 | Cambric | G06F 21/552 |
| 2021/0258401 A1 * | 8/2021 | Sullivan | H04W 4/08 |
| 2021/0350303 A1 | 11/2021 | Omar et al. | |
| 2022/0239661 A1 * | 7/2022 | Carver | G06F 11/1471 |
| 2023/0328122 A1 | 10/2023 | Frantz et al. | |
| 2025/0150467 A1 * | 5/2025 | Birsan | G06F 21/577 |

OTHER PUBLICATIONS

European Patent Office, Extended European Search Report (EESR), EP Application No. 24210006.3, dated Apr. 1, 2025, 9 pages.
Steve Goodyear, Practical SharePoint 2013 Enterprise Content Management, Apress, ISBML 978-1-4302-6169-8, DOI: https://doi.org/10.1007/978-1-4302-6170-4, dated Nov. 27, 2013, 93 pages.

* cited by examiner

*Primary Examiner* — Kendall Dolly

(57) ABSTRACT

Managing team access to workbooks embedded in client domains including hosting, by a workbook manager, a workbook embedded in a client domain accessible by a plurality of third-party user accounts divided into a plurality of teams, wherein each of the plurality of teams accesses a different underlying data set through the workbook; receiving, by the workbook manager from a client computing system, a request to create a team administrator account for a first team of the plurality of teams; and creating, by the workbook manager, the team administrator account with authorization to manage the workbook for the first team and without authorization to manage the workbook for third-party user accounts outside the first team.

20 Claims, 4 Drawing Sheets

MANAGING TEAM ACCESS TO WORKBOOKS EMBEDDED IN CLIENT DOMAINS

BACKGROUND

Field of the Invention

The field of the invention is data processing, or, more specifically, methods, apparatus, and products for managing team access to workbooks embedded in client domains.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for managing team access to workbooks embedded in client domains including hosting, by a workbook manager, a workbook embedded in a client domain accessible by a plurality of third-party user accounts divided into a plurality of teams, wherein each of the plurality of teams accesses a different underlying data set through the workbook; receiving, by the workbook manager from a client computing system, a request to create a team administrator account for a first team of the plurality of teams; and creating, by the workbook manager, the team administrator account with authorization to manage the workbook for the first team and without authorization to manage the workbook for third-party user accounts outside the first team.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
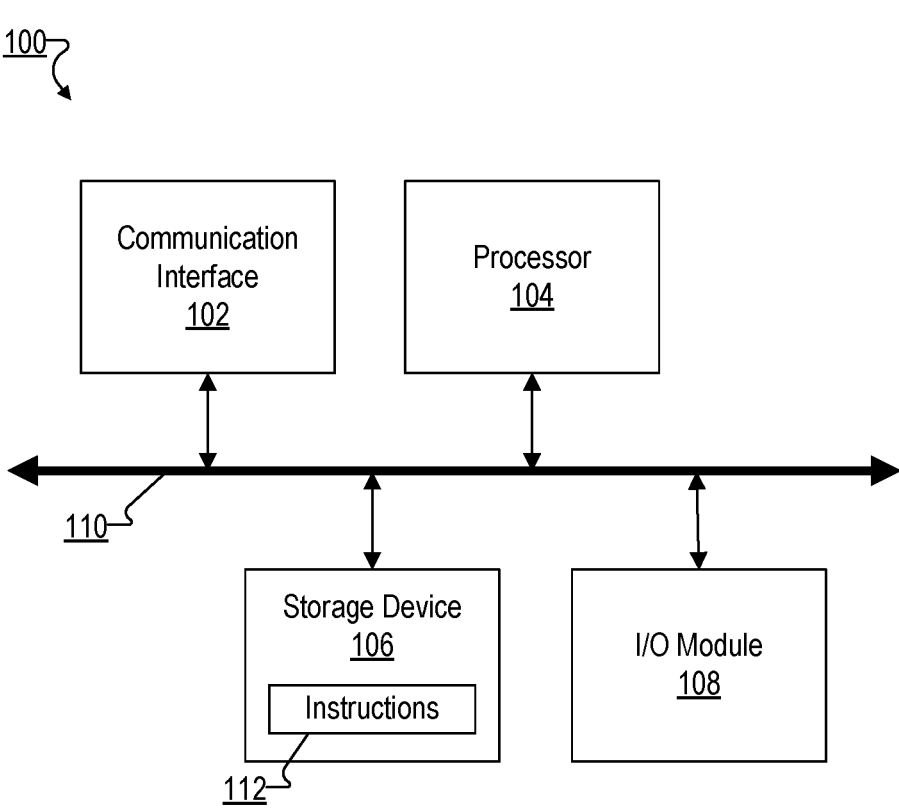
FIG. 1 sets forth a block diagram of an example system configured for managing team access to workbooks embedded in client domains according to embodiments of the present invention.

Example methods, apparatus, and products for managing team access to workbooks embedded in client domains in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
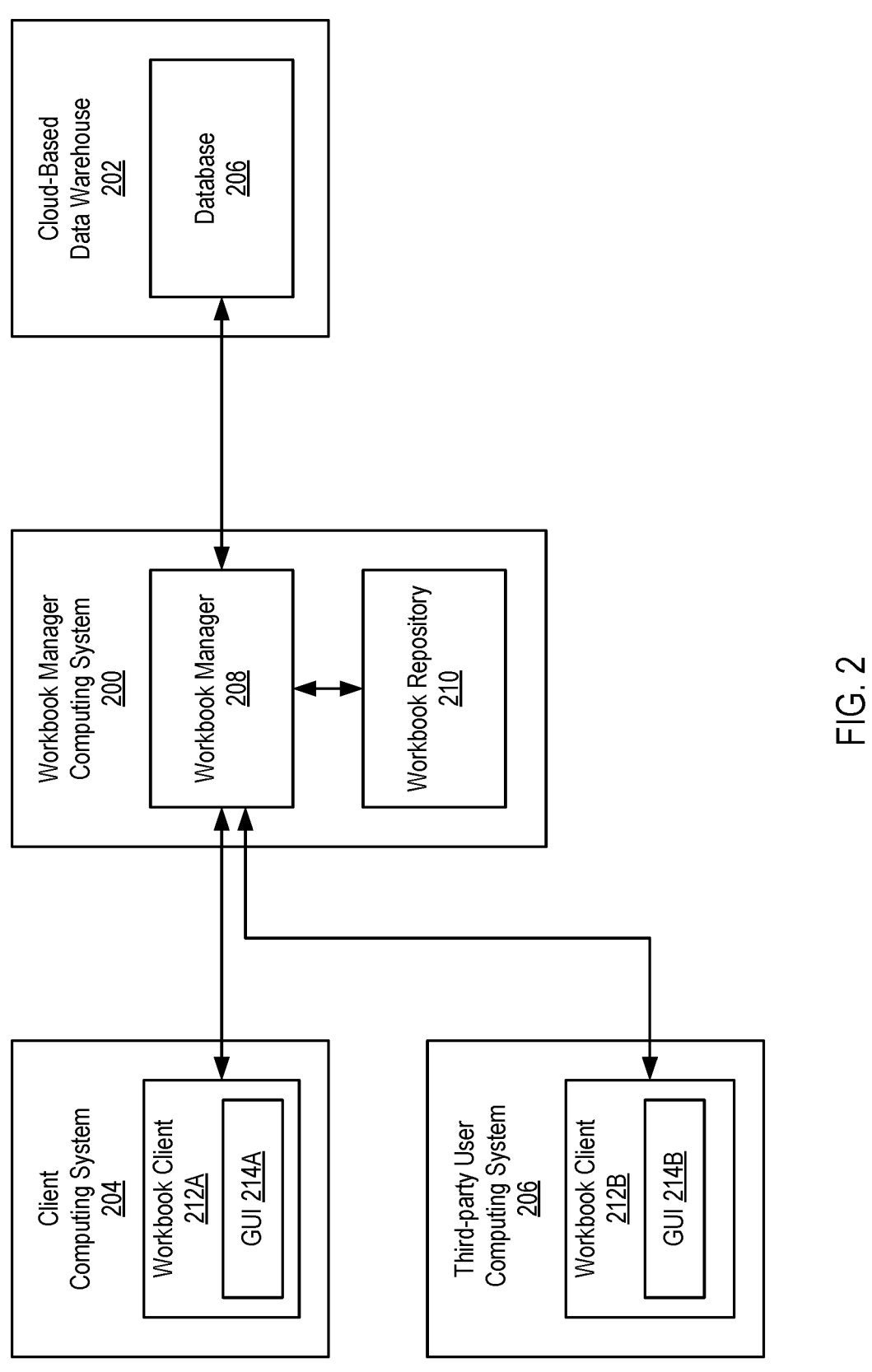
FIG. 2 sets forth a block diagram of an example system configured for managing team access to workbooks embedded in client domains according to embodiments of the present invention.

For further explanation, FIG. 2 illustrates a block diagram depicting an exemplary system for managing team access to workbooks embedded in client domains according to embodiments of the present invention. As shown in FIG. 2, the system includes a workbook manager computing system 200, a cloud-based data warehouse 202, a client computing system 204, and a third-party user computing system 206. The workbook manager computing system 200 includes a workbook manager 208 and a workbook repository 210. The client computing system 204 includes a workbook client 212A with a graphical user interface (GUI) 214A. The third-party user computing system 206 also includes a workbook client 212B with a GUI 214B. The cloud-based data warehouse 202 includes a database 204.

The workbook manager 208 is hardware, software, or an aggregation of hardware and software configured to present a dataset within a workbook on a client computing system 204 via the workbook client 212A, 212B. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212a, 212b on the client computing system 204 or third-party computing system 206 for presentation to a user of the client computing system 204 or third-party user. The workbook manager 208 may reside on the workbook manager computing system 200, which is an intermediary computing system between each client computing system, each third-party user computing system, and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212A, 212B is a part of the workbook manager 208 and works in concert with the workbook manager 208 to present a workbook on a client computing system 204. The workbook client 212A, 212B may perform local processing of changes made to the workbook and/or the dataset. The workbook client 212A, 212B may be an application executing within a web browser. The workbook client 212A, 212B may be part of an Internet application that includes the workbook manager 208 and is hosted on the workbook manager computing system 200.

The GUI 214A, 214B is a visual presentation configured to present data sets and workbooks to a client or third-party user. The GUI 214 may present a mechanism by which a user can manipulate and effect change to the workbook in the form of a workbook edit. The GUI 214 may be displayed on client computing system 204 or third-party computing system 206 (e.g., on a system display or mobile touchscreen).

The client computing system 204 is a computing system under the control of a client entity. The client entity is an entity with a direct relationship with the workbook manager 208 such that a user account within the client entity is authorized by the workbook manager 208 to access a workbook. The client entity may be a data tenant of the cloud-based data warehouse and control the data set underlying the workbook. The third-party user computing system 206 is a computing system under the control of a third-party entity. The third-party entity may have no direct relationship with the workbook manager 208. The third party user accounts may gain access to a workbook or underlying data set via the client entity.

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
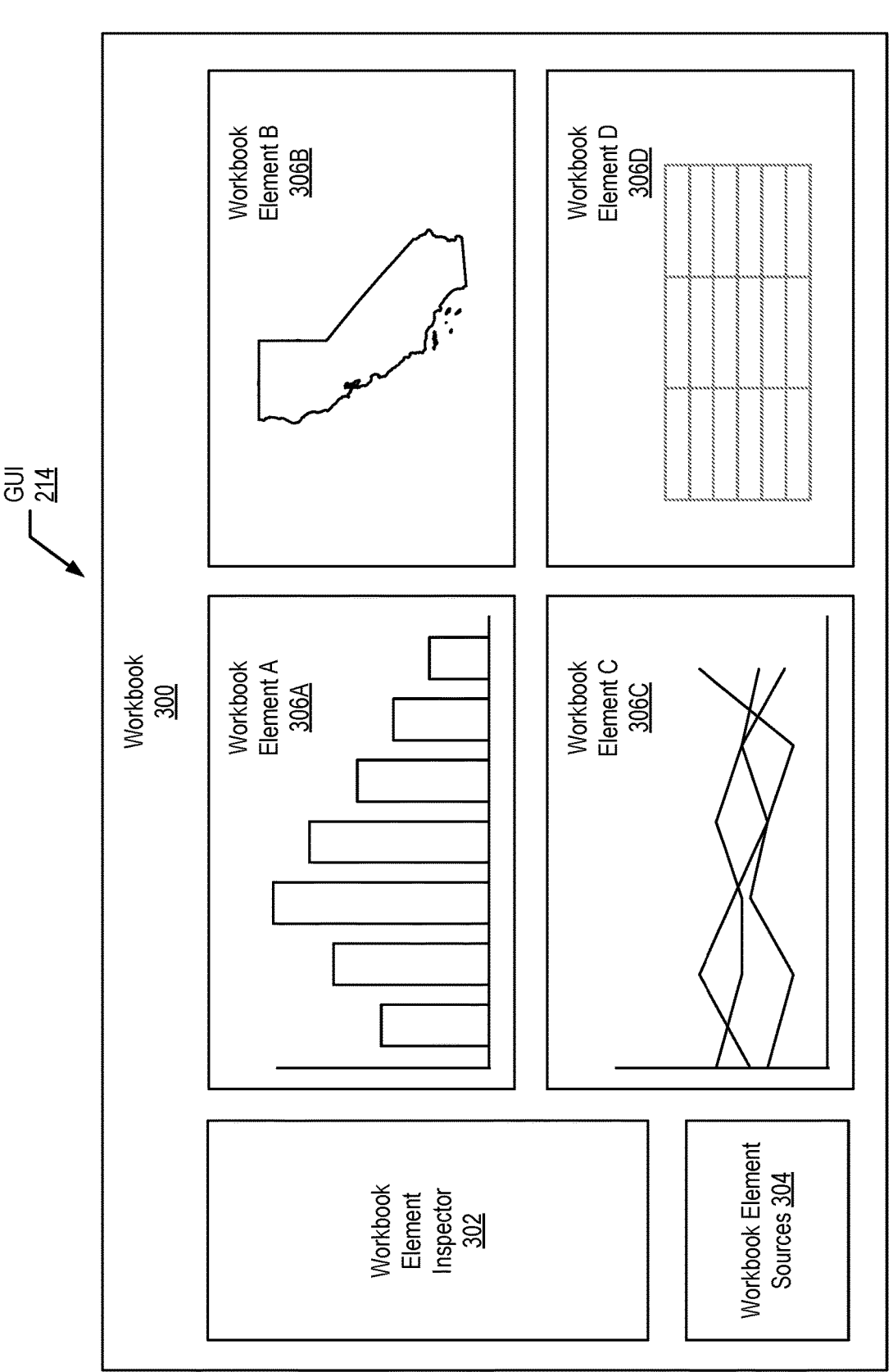
FIG. 3 sets forth a block diagram of an example system configured for managing team access to workbooks embedded in client domains according to embodiments of the present invention.

FIG. 3 shows an exemplary GUI for managing team access to workbooks embedded in client domains according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
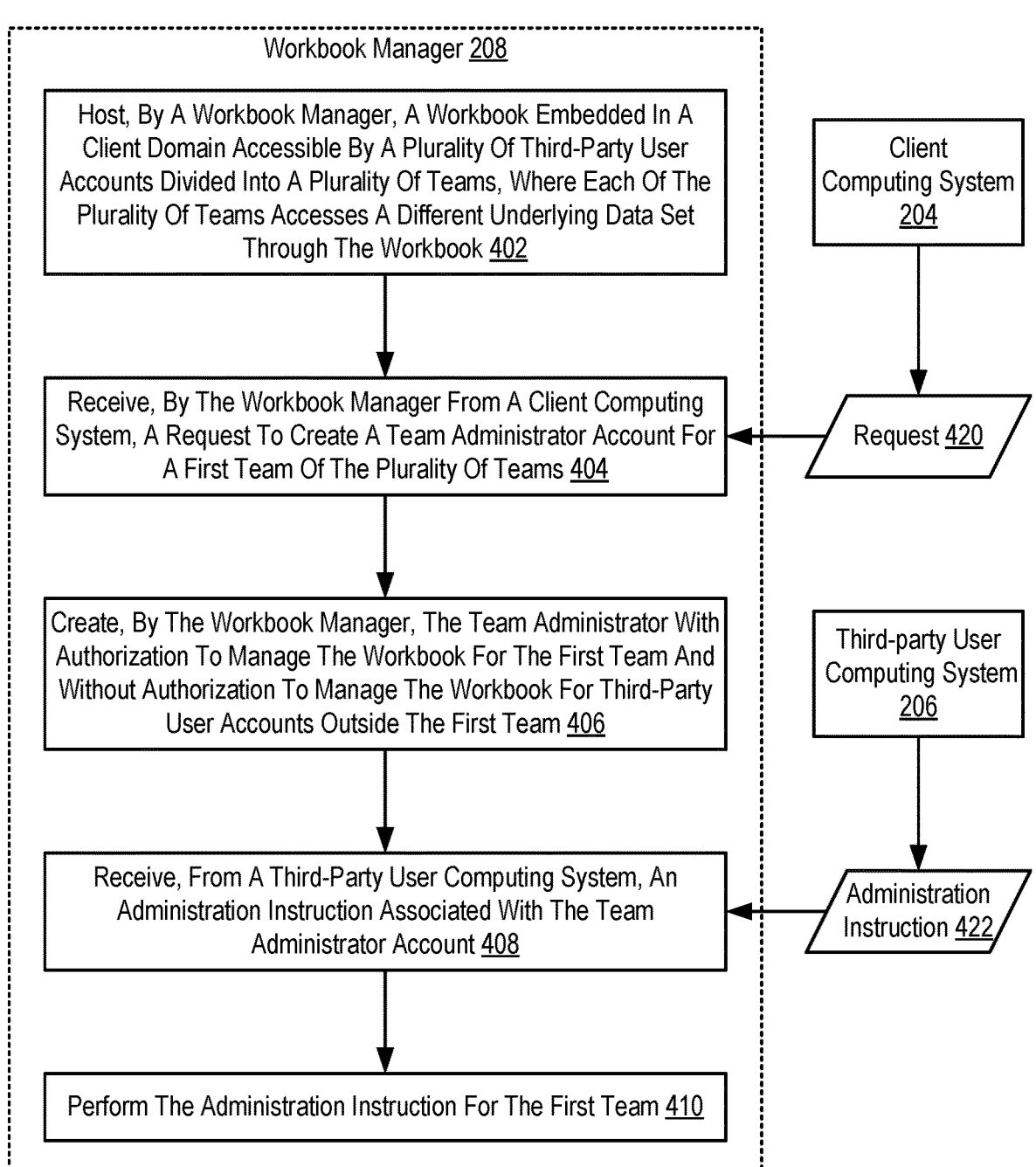
FIG. 4 sets forth a flow chart illustrating an exemplary method for managing team access to workbooks embedded in client domains according to embodiments of the present invention.

For further explanation, FIG. 4 sets forth a flow chart illustrating an exemplary method for managing team access to workbooks embedded in client domains according to embodiments of the present invention. The method of FIG. 4 includes hosting 402, by a workbook manager 208, a workbook embedded in a client domain accessible by a plurality of third-party user accounts divided into a plurality of teams, wherein each of the plurality of teams accesses a different underlying data set through the workbook. Hosting 402 the workbook embedded in a client domain may be carried out by the workbook manager 208 supplying the workbook metadata to a workbook client upon receiving an authenticated request for the workbook. A request for the workbook may include or otherwise be associated with a client account or third-party user account.

A client entity may provide a service to a group of third-party entities. As part of the service, each third-party entity may have a team of third-party user accounts, assigned by the client entity, with access to the embedded workbook. Further, each third-party user account is presented, via the embedded workbook, with a data set relevant to the third-party entity associated with that third-party user account. A team refers to a group of third-party user accounts with access to the workbook and underlying data set associated with that team (as dictated by the client entity).

A client domain is a network location hosting websites and other network services under the control of the client entity (which also controls the client computing system). The client domain may include a client webpage in which the workbook has been embedded. The workbook may be embedded using a block of code within the website that references the workbook on the workbook manager computing system. When the workbook is requested by a third-party user via the client domain, the request may include information about the third-party user account, the team/third-party entity to which the third-party user account belongs, and authentication information for the third-party user account (e.g., password, authentication token, etc.).

Each team (i.e., group of third-party user accounts associated with a third-party entity) only has access to the data set relevant to that team's third-party entity. Although each third-party user account may access the same workbook, the data set presented in that workbook is different. Each of the different underlying data sets may be hosted on a cloud-based data warehouse and managed by the client entity.

For example, a company "Rez" may provide a reservation system for different restaurants across the country. Rez (i.e., the client entity) employs the workbook manager to create a workbook to view and manage reservations, all of which are stored on the cloud-based data warehouse. Within Rez's domain, Rez creates a webpage and embeds the reservation workbook into the webpage. Joe's Steakhouse and Jane's Bistro (i.e., third-party entities) both engage Rez to manage their reservations. Rez creates, within the workbook manager, one team of user accounts for Joe's Steakhouse and another team of user accounts for Jane's Bistro. A chef for Joe's Steakhouse may log in to Rez's domain and access the webpage embedded with the workbook. As part of retrieving the webpage, a block of code is executed to retrieve the workbook from the workbook manager. This block of code may include information about the chef's user account, such as a user ID, password, or authentication code. Using the information about the chef's user account, the workbook manager may then retrieve the reservation data for Joe's steakhouse from the cloud-based data warehouse and populate the workbook for presentation on the chef's computing system.

The method of FIG. 4 also includes receiving 404, by the workbook manager 208 from a client computing system 204, a request 420 to create a team administrator account for a first team of the plurality of teams. Receiving the request 420 to create a team administrator account for a first team of the plurality of teams may be carried out by a client account utilizing the client computing system 204 to generate the request via the workbook client. The request 420 may include information describing the client entity, the first team/third-party entity, and the permissions to be granted to the team administrator. The client computing system 204 (and client account) may be under the control of a client entity that manages each of the different underlying data sets on the cloud-based data warehouse. Further, the client computing system 204 (and client account) may be under the control of a client entity that manages the client domain.

The method of FIG. 4 also includes creating 406, by the workbook manager 208, the team administrator account with authorization to manage the workbook for the first team and without authorization to manage the workbook for third-party user accounts outside the first team. Creating 406 the team administrator account for the first team may be carried out by the workbook manager 208 creating a new third-party user account with access to the workbook and underlying data set associated with the first team/third-party entity. Creating 406 the team administrator account for the first team may be carried out by elevating the authorizations of an existing third-party user account in the first team. Creating 406 the team administrator account may also include verifying that the client account that generated the request has authorization to create a team administrator for the particular team.

The team administrator account for the first team may be created with the permissions received in the request 420. The workbook manager 208 may first verify that the requested permissions do not exceed any limitations on team administrator accounts or third-party user accounts. For example, a team administrator account for the first team may be limited to actions involving members of the first team and the particular data set accessible by members of the first team. The team administrator account may have no permissions or ability to affect any change to third-party user accounts outside of the first team. Once created, data about the team administrator account may be stored on the workbook manager computing system.

The method of FIG. 4 also includes receiving 408, from a third-party user computing system 206, an administration instruction 422 associated with the team administrator account. Receiving 408 the administration instruction 422 associated with the team administrator account may be carried out by the workbook manager 208 receiving the administration instruction 422 from the team administrator account on the third-party user computing system 206. Upon receiving the administration instruction 422, the workbook manager 208 may first verify that the third-party user is authorized as a team administrator and that the administration request 422 is within the permissions granted to the team administrator account.

The administration instruction 422 may be an instruction to create a new third-party user account in the first team. For example, the team administrator may send the administration instruction 422 requesting that the workbook manager 208 create a new third-party user account with access to the workbook and data set associated with the first team. The team administrator may lack the permissions to grant a new or existing third-party user account permission to access any data set other than the data set associated with the first team. The administration instruction 422 may also be an instruction to remove a third-party user account from the first team. A third-party user account removed from the first team may be deleted entirely if that third-party user account is not a part of any other team.

The administration instruction 422 may be an instruction to integrate the workbook into an external application for the first team. An external application may be one hosted on a third-party domain under the control of the same third-party entity associated with the first team. The external application may be an application for use by user accounts hosted by the third-party entity (i.e., not members of the first team). Integrating the workbook (with the underlying data set associated with the particular third-party entity) into an external application may allow other accounts within the third-party domain to access the workbook even if those accounts are not members of the first team. The workbook may be retrieved using the team administrator's credentials. For example, the third-party entity may host a real-time communication application that the employees utilize to exchange messages. Integrating the workbook into the communications application may allow accounts within the third-party domain to access and post elements of the workbook within the communications application and have those elements be updated in real time with the underlying data.

The administration instruction 422 may be an instruction to modify the underlying data set accessible by the first team. Modifying the underlying data set may include making changes to the data set on the workbook manager computing system that configures the data from the cloud-based data warehouse for presentation by the workbook. Modifying the underlying data set may also include modifying the data on the cloud-based data warehouse.

The method of FIG. 4 also includes performing 410 the administration instruction 422 for the first team. Performing 410 the administration instruction 422 for the first team may be carried out by implementing the administration instruction 422 as requested by the team administrator for the first team. This may include creating a new third-party user account in the first team, removing a third-party user account from the first team, integrating the workbook into an external application for the first team, and/or modifying the underlying data set accessible by the first team.

In view of the explanations set forth above, readers will recognize that the benefits of managing team access to workbooks embedded in client domains according to embodiments of the present invention include:

Improving the operation of the computer system by offloading team administrative duties for a workbook to third-party user accounts, increasing system utility.

Improving the operation of the computer system by empowering third-party user accounts to manage third-party teams with access to a workbook managed by a client of the workbook manager, increasing system robustness.

Exemplary embodiments of the present invention are described largely in the context of a fully functional computer system for managing team access to workbooks embedded in client domains. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for managing team access to workbooks embedded in client domains, the method comprising:
    hosting, by a workbook manager, a workbook embedded in a client domain accessible by a plurality of third-party user accounts divided into a plurality of teams, wherein the workbook is a presentation of data from a cloud-based data warehouse, and wherein each of the plurality of teams accesses a different underlying data set through the workbook;
    receiving, by the workbook manager from a client computing system, a request to create a team administrator account for a first team of the plurality of teams; and
    creating, by the workbook manager, the team administrator account with authorization to manage the workbook for the first team and without authorization to manage the workbook for third-party user accounts outside the first team.

2. The method of claim 1, further comprising:
    receiving, from a third-party user computing system, an administration instruction associated with the team administrator account; and
    performing the administration instruction for the first team.

3. The method of claim 2, wherein the administration instruction is one selected from a group consisting of an instruction to create a new third-party user account in the first team and an instruction to remove a third-party user account from the first team.

4. The method of claim 2, wherein the administration instruction is an instruction to integrate the workbook into an external application for the first team.

5. The method of claim 2, wherein the administration instruction is an instruction to modify the underlying data set accessible by the first team.

6. The method of claim 1, wherein creating the team administrator account comprises elevating authorizations of one third-party user account in the first team.

7. The method of claim 1, wherein the client computing system is under control of an entity that manages each of the different underlying data sets.

8. The method of claim 1, wherein the client computing system is under control of an entity that manages the client domain.

9. The method of claim 1, wherein the workbook manager is hosted on an intermediary computing system between the client computing system and the cloud-based data warehouse.

10. The method of claim 1, wherein the workbook manager is executing on a workbook manager computing system between the third-party user computing system and a cloud-based data warehouse.

11. An apparatus for managing team access to workbooks embedded in client domains, the apparatus comprising a computer processor, a computer memory operatively coupled to the computer processor, the computer memory having disposed within it computer program instructions that, when executed by the computer processor, cause the apparatus to carry out:
    hosting, by a workbook manager, a workbook embedded in a client domain accessible by a plurality of third-party user accounts divided into a plurality of teams, wherein the workbook is a presentation of data from a cloud-based data warehouse, and wherein each of the plurality of teams accesses a different underlying data set through the workbook;
    receiving, by the workbook manager from a client computing system, a request to create a team administrator account for a first team of the plurality of teams; and
    creating, by the workbook manager, the team administrator account with authorization to manage the workbook for the first team and without authorization to manage the workbook for third-party user accounts outside the first team.

12. The apparatus of claim 11, wherein the computer program instructions further cause the apparatus to carry out:
    receiving, from a third-party user computing system, an administration instruction associated with the team administrator account; and
    performing the administration instruction for the first team.

13. The apparatus of claim 12, wherein the administration instruction is one selected from a group consisting of an instruction to create a new third-party user account in the first team and an instruction to remove a third-party user account from the first team.

14. The apparatus of claim 12, wherein the administration instruction is an instruction to integrate the workbook into an external application for the first team.

15. The apparatus of claim 12, wherein the administration instruction is an instruction to modify the underlying data set accessible by the first team.

16. The apparatus of claim 11, wherein creating the team administrator account comprises elevating authorizations of one third-party user account in the first team.

17. The apparatus of claim 11, wherein the client computing system is under control of an entity that manages each of the different underlying data sets.

18. The apparatus of claim 11, wherein the client computing system is under control of an entity that manages the client domain.

19. The apparatus of claim 11, wherein each of the different underlying data sets is hosted on a cloud-based data warehouse.

20. A computer program product for managing team access to workbooks embedded in client domains, the computer program product disposed upon a computer readable medium, the computer program product comprising computer program instructions that, when executed, cause a computer to carry out:

hosting, by a workbook manager, a workbook embedded in a client domain accessible by a plurality of third-party user accounts divided into a plurality of teams, wherein the workbook is a presentation of data from a cloud-based data warehouse, and wherein each of the plurality of teams accesses a different underlying data set through the workbook;

receiving, by the workbook manager from a client computing system, a request to create a team administrator account for a first team of the plurality of teams; and creating, by the workbook manager, the team administrator account with authorization to manage the workbook for the first team and without authorization to manage the workbook for third-party user accounts outside the first team.

* * * * *